United States Patent
Okuno (10) Patent No.: US 11,539,854 B2
(45) Date of Patent: Dec. 27, 2022

(54) IMAGE SCANNING APPARATUS AND METHOD FOR CONTROLLING APPARATUS HAVING SCANNING DEVICE

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/204,362

(22) Filed: Mar. 17, 2021

(65) Prior Publication Data

US 2021/0306510 A1   Sep. 30, 2021

(30) Foreign Application Priority Data

Mar. 31, 2020 (JP) .............................. JP2020-062687

(51) Int. Cl.
*H04N 1/32* (2006.01)

(52) U.S. Cl.
CPC ..... *H04N 1/32064* (2013.01); *H04N 1/32096* (2013.01); *H04N 2201/0094* (2013.01)

(58) Field of Classification Search
CPC ....................... H04N 1/32064; H04N 1/32096
USPC ................................................ 358/400, 474
See application file for complete search history.

(56) References Cited

U.S. PATENT DOCUMENTS

| | | | |
|---|---|---|---|
| 2014/0092433 A1 | 4/2014 | Kasamatsu | |
| 2014/0376037 A1 | 12/2014 | Onogi | |
| 2015/0029530 A1* | 1/2015 | Asai | H04N 1/00413 358/1.15 |
| 2015/0112934 A1* | 4/2015 | Quakkelaar | G06F 16/27 707/634 |
| 2018/0048775 A1* | 2/2018 | Horie | H04N 1/00413 |
| 2018/0307450 A1* | 10/2018 | Pandi | G06F 3/1238 |

FOREIGN PATENT DOCUMENTS

| | | |
|---|---|---|
| JP | 2014-072635 A | 4/2014 |
| JP | 2015-005922 A | 1/2015 |
| JP | 2018-182552 A | 11/2018 |

* cited by examiner

*Primary Examiner* — Gabriel I Garcia
(74) *Attorney, Agent, or Firm* — Scully Scott Murphy and Presser (57) ABSTRACT

According to aspects of the present disclosures, an image scanning apparatus receives an inquiry for assignment information and, when the assignment information designates none of multiple destination candidates, transmits the assignment information indicating the same to a mobile terminal. When receiving, from the mobile terminal, an assignment request requesting to assign a server as a destination, the image scanning apparatus checks whether the assignment information designates none of the multiple destination candidates. When it is confirmed that the assignment information designates none of the multiple destination candidates, a state of the assignment information is changed to a state of designating a server as the destination of image data.

12 Claims, 8 Drawing Sheets

IMAGE SCANNING APPARATUS AND METHOD FOR CONTROLLING APPARATUS HAVING SCANNING DEVICE

CROSS-REFERENCE TO RELATED APPLICATIONS

This application claims priority under 35 U.S.C. § 119 from Japanese Patent Application No. 2020-062687 filed on Mar. 31, 2020. The entire subject matter of the application is incorporated herein by reference.

BACKGROUND

Technical Field

The present disclosures relate to an image scanning apparatus and a method for controlling an apparatus having a scanning device.

Related Art

There have been known image scanning apparatuses such as scanners and multifunction peripherals (MFPs) configured to scan images recorded on media, generate image data, and transmit the image data, via various communication paths such as local area networks (LAN) and universal serial bus (USB) cables, to any one of multiple terminal devices. In such a case, when an image scanner is equipped with a touch-panel type display, for example, the user can easily select a desired terminal device from the multiple terminal devices as a destination of the image data each time.

SUMMARY

However, in an image scanning apparatus that is not equipped with a display or other means enabling a user to select a terminal device, it is general that a web page provided by an embedded web server (EWS) in the image scanning apparatus is displayed on an external device, and the user can log in to the external device using an administrator ID and password to select the destination for the image data. As described above, it is not very convenient for users because of the complicated procedure of setting up the destination by using the embedded web server, such as entering ID and password. On the other hand, if a user can unconditionally change the destination of the image data, another user different from the user, who made the change, may not know about the change of the destination and may transmit the image data to a wrong destination.

According to aspects of the present disclosure, there is provided an image scanning apparatus, comprising a scanning device configured to scan an image on a medium and generate image data, a storage, a communication device, and a controller. The storage is configured to store candidate information regarding multiple destination candidates to which image data generated by the scanning device can be transmitted and assignment information used to assign a destination of the image data, the assignment information either designating one of the multiple destination candidates or designating none of the multiple destination candidates. The controller is configured to perform an assignment request receiving process of receiving, from a terminal device via the communication device, an assignment request requesting to assign one of the multiple destination candidates as a destination to which the image data is to be transmitted, and when the assignment request is received and the assignment information designates none of the multiple destination candidates, a first assignment information changing process of changing a state of the assignment information such that one of the multiple destination candidates is designated as the destination of the image data.

According to aspects of the present disclosure, there is provided a method for controlling an apparatus having a scanning device configured to scan an image on a medium and generate image data, a storage and a communication device. The storage is configured to store candidate information regarding multiple destination candidates to which image data generated by the scanning device can be transmitted and assignment information used to assign a destination of the image data, the assignment information either designating one of the multiple destination candidates or designating none of the multiple destination candidates. The method comprising an assignment request receiving process of receiving, from a terminal device via the communication device, an assignment request requesting to assign one of the multiple destination candidates as a destination to which the image data is to be transmitted, and when the assignment request is received and the assignment information designates none of the multiple destination candidates, a first assignment information changing process of changing a state of the assignment information such that one of the multiple destination candidates is designated as the destination of the image data.

DETAILED DESCRIPTION OF THE EMBODIMENT

Overall Configuration of System

An embodiment of the present disclosures will be described below, with reference to the drawings. In this embodiment, an image scanning system including a so-called MFP, capable of performing a printing function, a scanning function and a copying function, and a portable terminal and a server will be described. The MFP generates an image file in a format such as jpeg, gif, etc., by scanning a document using a scanning function.

Figure 1:
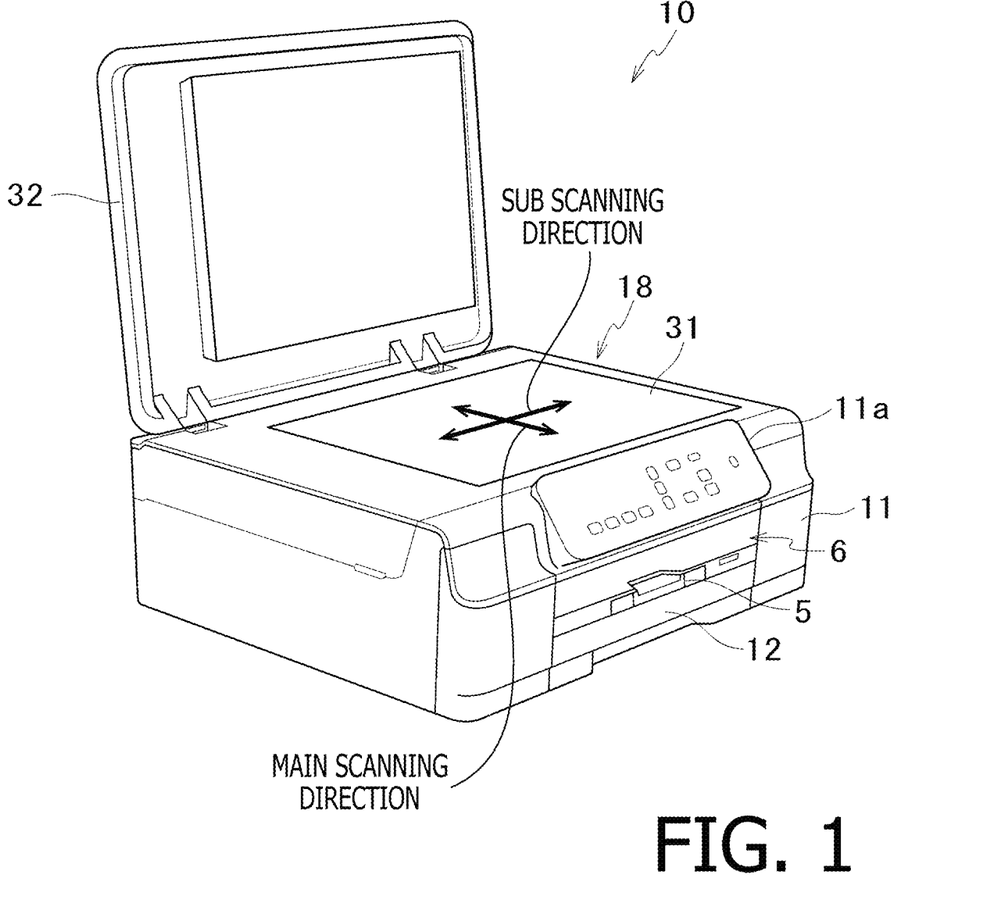
FIG. 1 is a diagram showing an MFP as an image scanning apparatus according to an embodiment of the present disclosures.

As shown in FIG. 1, the MFP 10 includes a housing 11, a cover 32 attached to the housing 11 so that the cover 32 can be pivoted between a position where the cover 32 covers a top surface of the housing 11 and a position where the top surface of the housing 11 is not covered by the cover 32. The MFP 10 further includes a sheet feed tray 12 detachably stored in the housing 11, and a sheet discharge tray 5. In the housing 11, a print module 6 is disposed in the housing 11, which is configured to form an image on a sheet in accordance with a well-known inkjet printing method. Above the print module 6, a flatbed type scanning module 18 is arranged above the print module 6. The scanning module 18 is configured to scan an image on an original sheet and generates image data. As a modification, the scanning module 18 may have an automatic document feeder (ADF). An operation panel IIa is disposed on the surface of the housing 11. On the operation panel 11a, an LCD module 19, described below, is provided.

Figure 2:
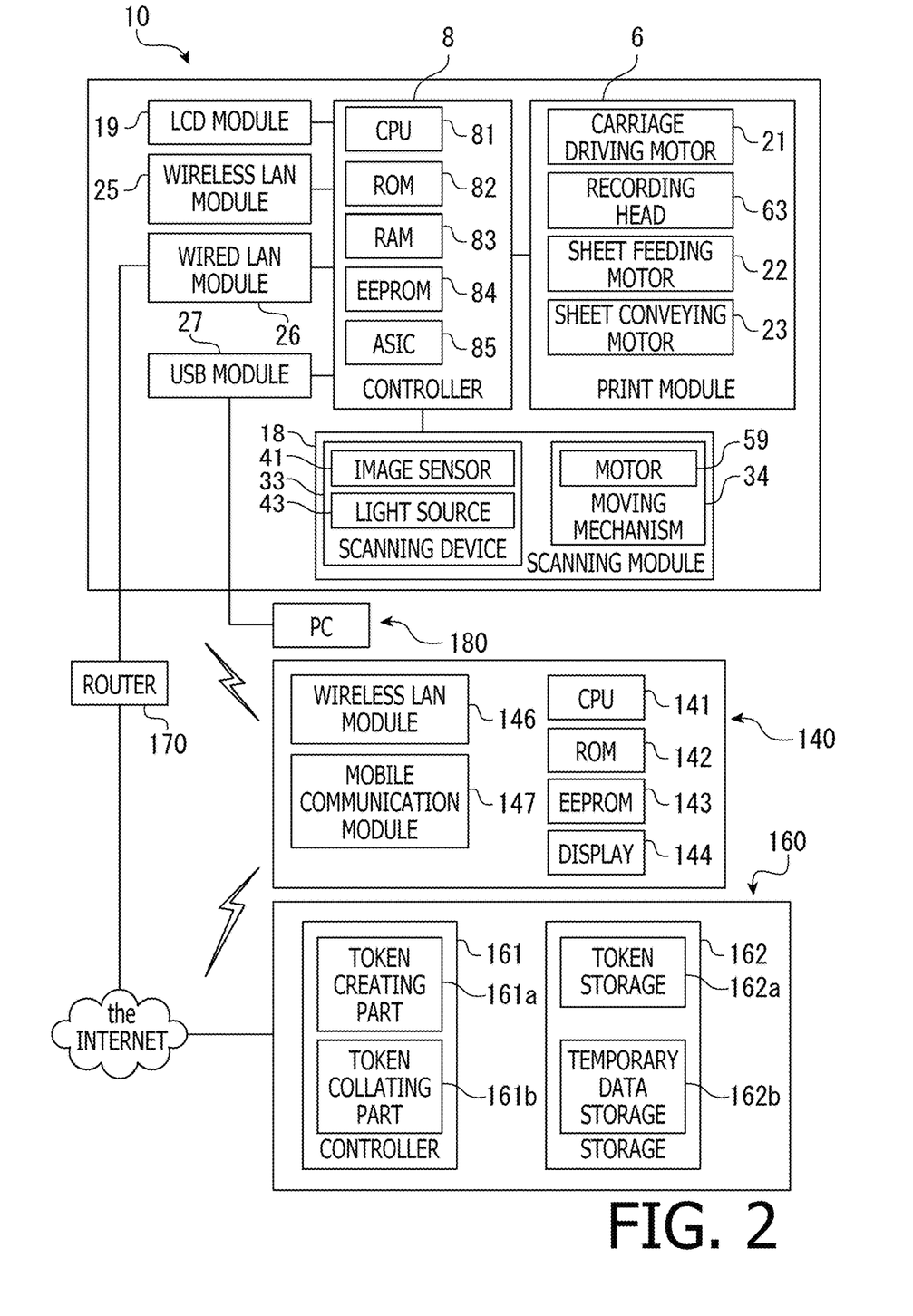
FIG. 2 is a block diagram illustrating a hardware configuration of an image scanning system including the MFP shown in FIG. 1.

The scanning module 18 includes a platen glass 31, a cover 32, and a scanning device 33 (see FIG. 2). The platen glass 31 is a translucent plate-like member and is fitted into an opening formed on an upper surface of the housing 11. According to the present embodiment, the platen glass 31 has a rectangular shape with long and short sides. In the following description, a direction parallel to the short sides of the rectangular shape will be referred to as a main scanning direction, and a direction parallel to the long sides of the rectangular shape will be referred to as a sub scanning direction (see FIG. 1).

Next, referring to FIG. 2, a block configuration of the image scanning system including the MFP 10 according to the present embodiment will be described. As shown in FIG. 2, the image scanning system includes the MFP 10, a mobile terminal 140, and a server 160. Although FIG. 2 depicts only one MFP 10 connected to a router 170, two or more of the MFP 10, the printer and the scanner may be connected to the router 170.

A carriage driving motor 21, a recording head 63, a sheet feeding motor 22, a sheet conveying motor 23 of the MFP 10 are electrically connected to the controller 8 of the MFP 10. The recording head 63 is formed with a plurality of nozzles configured to eject ink droplets. The carriage driving motor 21 is a drive source for moving the carriage, on which the recording head 63 is mounted, reciprocally in the main scanning direction. The sheet feeding motor 22 and the sheet conveying motor 23 are the drive sources for rotating a sheet feeding roller and a plurality of sheet conveying rollers, respectively. By rotating the rollers, the sheet, which is a recording medium, is conveyed along a conveying path. In addition, the scanning module 18, the LCD module 19, a wireless LAN module 25, a wired LAN module 26 and a USB module 27 are electrically connected to the controller 8. A PC 180 can be connected to the USB module 27 with a USB cable.

The scanning module 18 includes the scanning device 33 and a moving mechanism 34. The scanning device 33 includes a linear type image sensor 41 such as a CCD and a light source 43. The moving mechanism 34 includes a motor 59. The image sensor 41 is elongated in the main scanning direction and is configured to scan an image on an original sheet placed on the platen glass 31 while moving in the sub scanning direction by the moving mechanism 34 and output image data representing the scanned image.

The LCD module 19 includes a display configured to display various pieces of information related to the MFP 10 in text and/or images. The display is of a touch screen type, and when the user touches the display, a position information of a touched position is output to the controller 8. That is, according to the present embodiment, the LCD module 19 serves as a receiving device that receives input from the user's operation and also as a notification device.

The wireless LAN module 25 performs a network communication with another wireless communication device (in this embodiment, with the mobile terminal 140) in compliance with a wireless LAN communication standard such as IEEE 802.11ac. The wired LAN module 26 has a LAN port, which is a LAN cable slot, and connects the MFP 10 to the Internet via the router 170. The cloud cooperation function is a function that enables a terminal device not belonging to the same network to which the MFP 10 is connected in order to perform operations related to the MFP 10 via the server. The MFP 10 may be connected to the router 170 and the Internet via the wireless LAN module 25.

As shown in FIG. 2, the controller 8 includes the CPU 81, the ROM 82, the RAM 83, the EEPROM 84, and the ASIC 85, which operate together to control operations related to the cloud cooperation function. Further, the controller 8 controls the operation of each part of the print module 6, each part of the scanning module 18, the LCD module 19, the wireless LAN module 25 and the wired LAN module 26. In the present embodiment, a communication device is formed by both the wireless LAN module 25 and the wired LAN module 26.

The controller 8 is configured to control MFP 10 to perform an image recording operation in which the print module 6 is caused to record an image pertaining to the image data on the sheet 9, an image scanning operation in which the scanning module 18 is caused to scan an image on the original sheet placed on the platen glass 31, generate image data representing the scanned image, and store the image data at a desired location, and a copying operation in which the print module 6 and the scanning module 18 are controlled to record an image on the sheet 9 based on the image data generated by the scanning module 18.

In this embodiment, the EEPROM 84 is configured to store information about multiple destination candidates of the image data generated by scanning the image by the scanning module 18, and assignment information to assign the destination of the image data. The destination candidates include, for example, a device connected to the MFP 10 via the USB module 27 (PC 180), a device connected to the MFP 10 via the wireless LAN module (mobile terminal 140), a device in the same network in wired or wireless connection to the router 170, a server on the Internet (server 160) and the like, and the EEPROM 84 retains information that distinguishes these destination candidates from each other. Further, the EEPROM 84 may retain information, for one or more of the multiple destination candidates, that distinguishes which program, which is installed in the destination candidate, is to be transmitted. For example, for a device connected to the MFP 10 via the USB module 27, in addition to storing the data in a particular folder in the device, a further option program such as OCR, image processing, or transmission of e-mail may be provided as one of the multiple destination candidates.

The EEPROM 84 also stores assignment information for assigning a destination of the image data generated by scanning the image with the scanning module 18. The assignment information may be configured to designate any one of the multiple destination candidates, or none of the destination candidates. In an initial state, the assignment information does not designate any of the multiple destination candidates. The controller 8 is configured to rewrite the assignment information stored in the EEPROM 84.

When the assignment information designates a server on the Internet as the destination, the image data transmitted from the MFP 10 is stored in that server. The server may further transmit the image data to another terminal device on the Internet thereafter. The destination terminal device to which the image data is transmitted from the server may be determined by any method. For example, the server may write the scanning settings including the ID information of the destination terminal device via the Internet to a device such as the MFP 10 in advance, and when the MFP 10 may transmit the ID information of the destination terminal device along with the image data to the server, the server may transmit the image data to the destination terminal device having the ID information. Therefore, the mobile terminal 140 that transmitted an enabling request (described later) does not have to be identical to a terminal that is to receive the image data transmitted by the server. However, in this embodiment, it is assumed that the server 160 transmits the image data to the mobile terminal 140 that transmitted the enabling request, as described below.

Although FIG. 2 illustrates one CPU 81 and one ASIC 85, the controller 8 may include only one CPU 81 which is configured to perform all the necessary processes. Alternatively, the controller 8 may include a plurality of CPUs 81 which are configured to perform the necessary processes in a shared manner. Further, the controller 8 may include only one ASIC 85 which may perform all the necessary processes. Alternatively, the controller 8 may include a plurality of ASICs 85 which may perform the necessary processes in a shared manner.

The mobile terminal 140 is, for example, a smartphone or tablet PC, and has a CPU 141, a ROM 142, and an EEPROM 143. In the EEPROM 143, an operating system (OS) that controls the operation of the mobile terminal 140, an MFP management program (hereinafter referred to as an "MFP management app" or simply "app") that controls the operation of the MFP 10, and the like are installed. The mobile terminal 140 has a touch-panel type display 144, which serves as an input/output device.

The mobile terminal 140 further has a wireless LAN module 146 and a mobile communication module 147. In this embodiment, the wireless LAN module 146 is directly and wirelessly connected to the wireless LAN module 25 of the MFP 10 (ad hoc mode) during the setup of the cloud cooperation function, which will be described below.

When the router 170 includes a wireless LAN module, the wireless LAN module 146 may be wirelessly connected to the MFP 10 via the router 170 (infrastructure mode). When performing an operation (e.g., to instruct remote scanning) related to the MFP 10 using the cloud cooperation function, the mobile terminal 140 can communicate wirelessly with the server 160 via the wireless LAN module 146 or the mobile communication module 147. The mobile communication module 147 may be compliant with the fourth generation mobile communication standard (4G), for example.

The server 160 includes a CPU, a ROM, a RAM and an HDD (Hard Disk Drive), etc. (not shown). In the HDD, an operating system that controls the operation of the server 160 and a management program relating to the cloud cooperation function of the MFP 10 are installed.

In the server 160, a controller 161 and a storage 162 are configured using a management program relating to the hardware and cloud cooperation functions described above. The controller 161 includes a token creating part 161a and a token collating part 161b. The storage 162 includes a token storage 162a and a temporary data storage 162b.

Setup and Assignment Request for Cloud Cooperation Function

Figure 3:
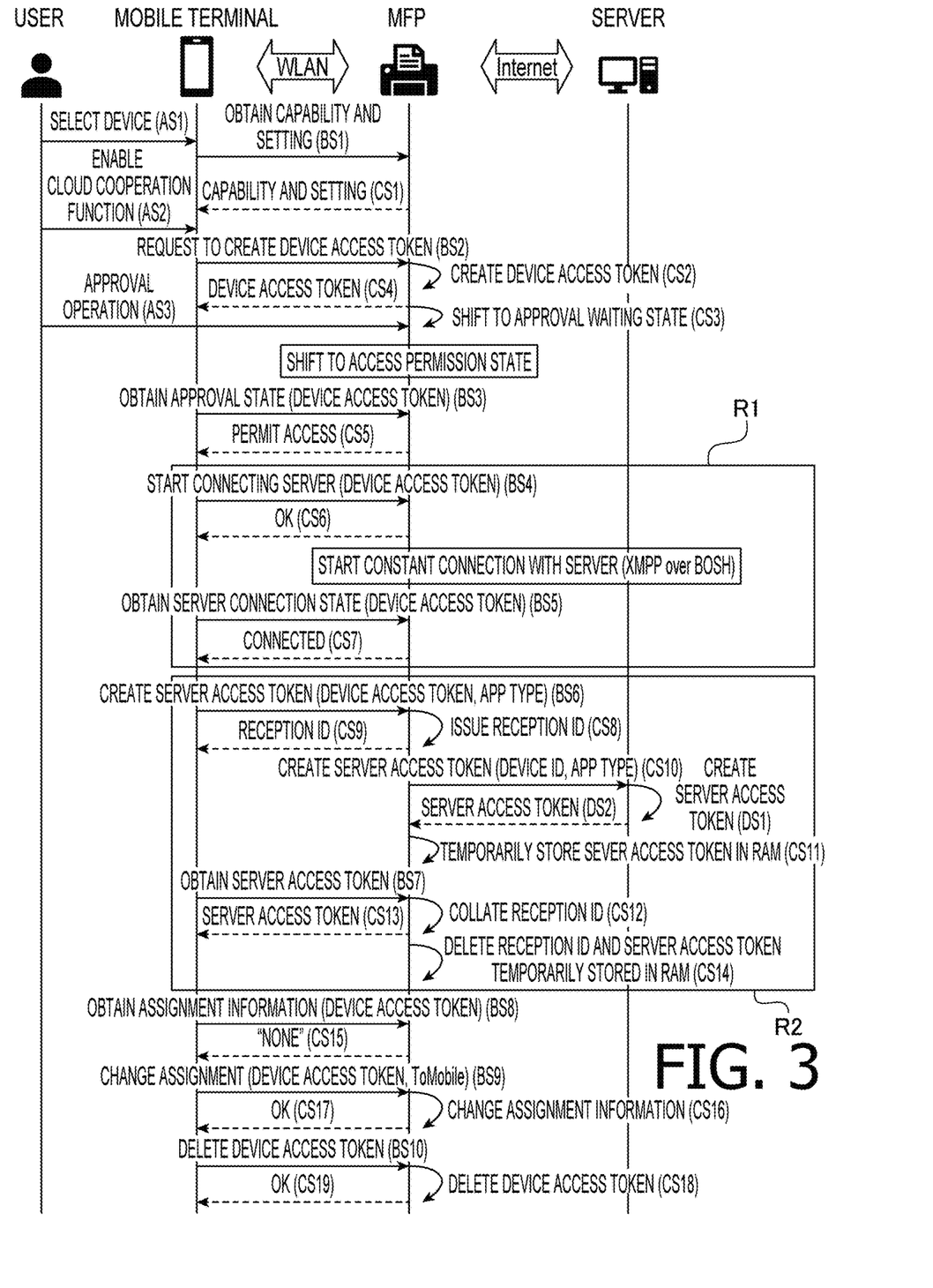
FIG. 3 is a setup sequence diagram of a cloud cooperation function in the image scanning system including the MFP shown in FIG. 1.

Next, the operation relating to a setup and an assignment regarding of the cloud cooperation function according to the present embodiment will be described with reference to FIGS. 3-5.

In the image scanning system according to the present embodiment, the cloud cooperation function is not set up in an initial state. Therefore, it is necessary to set up the cloud cooperation function before the cloud cooperation function is used for the first time. There are two types of setups to set up the cloud cooperation function. One type of setup is to make the MFP 10 ready to connect to the server 160 (device setup). The other type of setup is to make the mobile terminal 140 ready to connect to the server 160 (terminal setup). After the device setup and the terminal setup are performed by one mobile terminal, the other mobile terminal does not need to perform the device setup for the MFP 10, and only needs to perform the terminal setup. As described above, at the time of setting up the cloud cooperation function, the mobile terminal 140 is wirelessly connected to the MFP 10 in the same network as the MFP 10 is connected.

First, the user launches the MFP management app on the mobile terminal 140, and then performs the prescribed operations on the app by tapping the display 144 to display a list of one or more devices (printer, scanner, MFP, etc.) on the same network and connected to the router 170 is displayed on the display 144. The user then selects the desired device to be targeted for the cloud cooperation function from among these devices by tapping the display 144 (AS1). The explanation will now proceed, assuming that the selected device is the MFP 10 of FIG. 1. Then, the mobile terminal 140 communicates with the selected MFP 10 based on the SNMP (Simple Network Management Protocol) to obtain capability and setting information of the MFP 10 (BS1, CS1). The capability information includes information on whether or not the selected MFP supports the cloud cooperation function. The setting information includes various configurable items such as scanning resolution, image size and the like.

When the selected MFP supports the cloud cooperation function, the display 144 of the mobile terminal 140 displays a setup screen that includes an enable button for the cloud cooperation function and a list of functions that can be used with the cloud cooperation function.

When the user taps the enabling button (AS2), the mobile terminal 140 transmits a request for creating a device access token (i.e., an enable request) to the MFP 10 (BS2), and the MFP receives the request for creating a device access token (an enabling request receiving process). This request for creating the device access token includes information indicating that the access type is the cloud cooperation function, and the access is based on the HTTPS protocol. At this time, if another user is using the MFP 10 (which is in operation, such as printing, by an order from another user, or is in a state other than the standby state), the mobile terminal 140 is notified of this fact, and the display 144 of the mobile terminal 140 shows such a statement on the display 144.

If no other user is using the MFP 10, the controller 8 of the MFP 10 creates a device access token (CS2: Device access token creation process). In this embodiment, the device access token is information including a particular number of digits of random and unique character string created by the controller 8 each time a request for creating the device access token is received. The device access token is "unapproved" in the initial state and is considered "approved" after the approval operation, as described below. When the MFP 10 receives a request to create a device access token (the enabling request), the MFP 10 shifts its state from a standby state to an approval waiting state (CS3). Which of the multiple states, such as the standby state, the MFP 10 is in is stored in the RAM 83. The MFP 10, which has shifted its state to the approval waiting state, displays a screen on the LCD module 19 that prompts the user to perform an approval operation to approve the enabling request for a particular period of time (notification process). For example, as shown in FIG. 4, the MFP 10 displays a text message "PERMIT REMOTE ACCESS?" and "YES" and "NO" buttons.

The created device access token is temporarily stored in the RAM 83 of the controller 8 and is further transmitted to the mobile terminal 140 as unapproved (CS4: Device access token transmission process). The mobile terminal 140 temporarily stores the received device access token in the ROM 142. The display 144 of the mobile terminal 140 then displays a screen including a text message that prompts the user to perform an approval operation on the screen of the MFP.

When the user taps the "Yes" button displayed on the LCD module 19 of the MFP 10 (AS3), the controller 8 of the MFP 10 checks that the approval operation is received from the user (approval confirmation process). Then, the MFP 10 shifts its state from an approval waiting state to an access permission state. The controller 8 changes the state of the device access token temporarily stored in the RAM 83 to the approved state (changing process).

The access permission state is a state in which access to the MFP 10 is permitted from the mobile terminal 140 in order to continue the setup. Thus, according to the present embodiment, the state of the MFP 10 can only be changed to the access permission state and the setup can be continued only when the "Yes" button displayed on the LCD module 19 of the MFP 10 can be tapped after the enabling request. Since a user in a distant location cannot operate the MFP 10, unauthorized access by a malicious third party in a distant location can be prevented and security can be ensured.

After receiving the device access token, the mobile terminal 140 performs a periodic query (polling) of the state of the MFP 10 based on the HTTPS protocol (BS3) until the state of the MFP 10 shifts from the approval waiting state to the access permission state. This query includes the device access token as identification information of the mobile terminal 140 that transmitted the enabling request.

When the MFP 10 receives the query, the MFP 10 collates the device access token pertaining to the received query with the device access token temporarily stored in the RAM 83. When it is determined in this collation that the device access token is appropriate and it is further confirmed that the device access token has been approved, i.e., the "Yes" button has been tapped and the device has been shifted to the access permission state, the MFP 10 transmits information that the device access token has been shifted to the access permission state ST3 to the mobile terminal 140 (CS5). Then, the screen shown in FIG. 4D is displayed on the display 144 of the mobile terminal 140.

The access permission state shifts to the standby state when a particular access permission period ends or when an access termination notification transmitted from the mobile terminal 140 according to a user operation is received.

On the other hand, when the user taps the "No" button displayed on the LCD module 19 of the MFP 10 (an inhibition operation), the state of the MFP 10 shifts from the approval waiting state to an access inhibited state. In this embodiment, any operation other than tapping of the "Yes" button (e.g., depressing the stop key) may be treated as an inhibition operation. When it is confirmed that the "No" button has been tapped and the state of the MFP 10 has shifted to the access inhibited state in response to the polling of the state of the MFP 10 from the mobile terminal 140, information that the state of the MFP 10 has shifted to the access inhibited state is sent to the mobile terminal 140. Then, a screen includes a text message "Setup failed: not approved by the device" and a "back" button is displayed on the display 144 of the mobile terminal 140.

The MFP 10 does not execute the notification process and the approval checking during the period of time in which the MFP 10 is in the access inhibited state, even if there is a new enabling request. The state of the MFP 10 returns to the standby state after a particular period of time has elapsed after the state of the MFP 10 has shifted to the access inhibited state.

Figure 4:
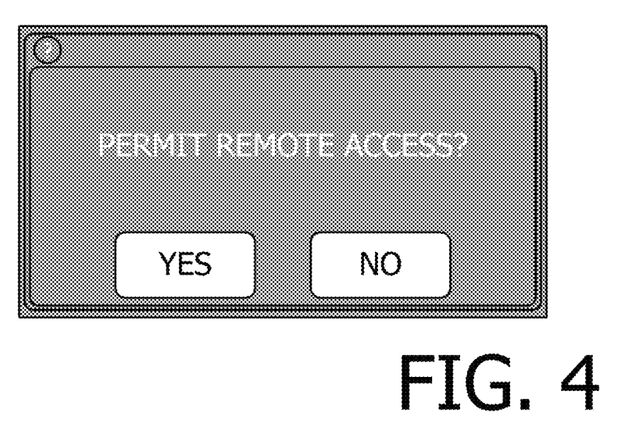
FIG. 4 is a schematic diagram of an approval screen displayed on an LCD module of the MFP during the setup of the cloud cooperation function.

Also in a case where no approval operation is performed within a particular period of time after the screen shown in FIG. 4 is displayed on the LCD module 19 of the MFP 10 (no operation timeout), the state of the MFP 10 returns to the standby state. Also in the case where a signal to cancel the enabling request is received from the mobile terminal 140 in the approval waiting state, the state of the MFP 10 returns to the standby state.

After receiving information indicating that the state of the MFP 10 has shifted to the access permission state, the mobile terminal 140 transmits, to the MFP 10, a request to start a constant connection with the server 160 based on the HTTPS protocol (BS4). This constant connection starting request includes the device access token, and when the MFP 10 confirms that the collation of the device access token related to the constant connection starting request as received with the device access token temporarily stored in the RAM 83 has been successfully performed, the MFP 10 transmits a signal to the mobile terminal 140 indicating a successful completion of the collation (CS6). Then, when the MFP 10 is not in constant connection with the server 160 at this point, the constant connection based on an XMPP (Extensible Messaging and Presence Protocol) over BOSH (Bidirectional-streams Over Synchronous (HTTP) is started with the server 160. Once the constant connection is established, even if the power of the MFP 10 is turned off, the constant connection is established as soon as the power is turned on again. When the MFP 10 confirms that the collation of the received device access token was not successfully completed, the MFP 10 transmits a signal indicating a collation error to the mobile terminal 140.

The mobile terminal 140, which has received the signal indicating the normal completion of collation, makes a periodic query (polling) to the MFP 10 to obtain a server connection state, based on the HTTPS protocol (BS5). This query includes a device access token as identification information of the mobile terminal 140 that transmitted the enabling request. When the MFP 10 receives the query, the MFP 10 collates the device access token pertaining to the received query with the device access token temporarily stored in the RAM 83. When it is determined in this collation that the device access token is appropriate, and furthermore, it is confirmed that the constant connection with the server 160 has been changed from "not connected" to "connected," information indicating the change of the connection state is transmitted to the mobile terminal 140 (CS7).

As described above, a process R1 from BS4 to CS7 is not performed when the constant connection between the MFP 10 and the server 160 has already been established at the time when the mobile terminal 140 makes the enabling request of the cloud cooperation function.

Next, the mobile terminal 140, which receives information that the constant connection state is "connected," transmits a request to create a server access token to the MFP 10 based on the HTTPS protocol (BS6), and the MFP 10 receives the request. The request to create the device access token includes the device access token and information about the type of the app. The process here is performed as an asynchronous process, as the connection with the server 160 may take some time. The MFP 10, which receives the request to create the server access token, collates the device access token pertaining to the received creation request with the device access token temporarily stored in the RAM 83. When this collation determines that the device access token is appropriate, the MFP 10 issues a reception ID (information containing a particular number of digits of random and unique character string created each time) (CS8) and temporarily stores the reception ID in the RAM 83. The reception ID is then transmitted to the mobile terminal 140 (CS9). When the MFP 10 confirms that the received device access token was not successfully collated, the MFP 10 transmits a signal indicating a collation error to the mobile terminal 140.

After creating the reception ID, the MFP 10 transmits a request to create a server access token to the server 160 based on the HTTPS protocol (CS10). The creation request includes a device ID (e.g., an MAC address of the MFP or a unique product serial number for the individual MFP) and information on the type of app. The token creating part 161a of the server 160, which receives the request to create the server access token, creates the server access token (DS1). In this embodiment, the server access token is information including a particular number of digits of random and unique character string created by the token creating part 161a each time the request to create the server access token is received. In this embodiment, the server access token created by the server has an expiration date (as a modification, the server access token may not have an effective period). The created server access token is stored in the token storage 162a in association with the device ID and app type information along with the information indicating the expiration date, and is further transmitted to the MFP 10 along with the information indicating the expiration date, the device ID, and the app type information (DS2). Then, the MFP 10 receives the token. The MFP 10 temporarily stores the received server access token and other information in the RAM 83 (CS11).

After receiving the reception ID, the mobile terminal 140 makes a periodic query (polling) to the MFP 10 for the reception of the server access token, based on the HTTPS protocol (BS7). This query includes the reception ID. In response to the query, the MFP 10 collates the received reception ID with the reception ID temporarily stored in the RAM 83 (CS12). After confirming that the collation has been successfully performed, the server access token, information indicating the expiration date, the device ID, and the app type information are sent to the mobile terminal 140 (CS13). The mobile terminal 140 stores the received server access token and the like in the EEPROM 143. In this embodiment, the MFP 10 transmits the server access token, etc. received from the server 160 as is (without processing anything) to the mobile terminal 140. After that, the MFP 10 deletes the reception ID and server access token, etc. temporarily stored in the RAM 83 (CS14).

A process R2 from BS6 to CS14 is performed only once for a single combination of a mobile device app type and an image scanning apparatus, within a validity period (i.e., before the expiration date) of the server access token.

After receiving the server access token, the mobile terminal 140 transmits an inquiry for the assignment information stored in the EEPROM 84 (i.e., an assignment information obtaining request) to the MFP 10 (BS8). The assignment information obtaining request includes the device access token. The MFP 10 then receives the assignment information obtaining request (inquiry receiving process, device access token receiving process). The MFP 10 collates the device access token related to the assignment information obtaining request received with the device access token temporarily stored in the RAM 83 (collating process). When it is determined in this collation that the device access token is appropriate, the MFP 10 checks the assignment information in EEPROM 84, and when the assignment information is in a state where none of the multiple destination candidates has been specified (NONE), the assignment information is transmitted to the mobile terminal 140 to indicate that none of the multiple destination candidates has been specified (CS15: assignment information transmitting process). The MFP 10 checks the assignment information in the EEPROM 84, and when the assignment information is in a state where one of the plurality of destination candidates is designated, the assignment information is transmitted to the mobile terminal 140 to indicate that one of the plurality of destination candidates is designated.

The mobile terminal 140, which has received assignment information that none of the multiple destination candidates has been designated, transmits an assignment request (ToMobile), to the MFP 10, requesting that the destination of the image data be assigned to a desired device (e.g., the server 160) among the plurality of destination candidates (BS9). This assignment request includes the device access token as well as the identification information of the destination device to which the image data is to be transmitted. The MFP 10 then receives the assignment request from the mobile terminal 140 (assignment request receiving process).

Figure 5:
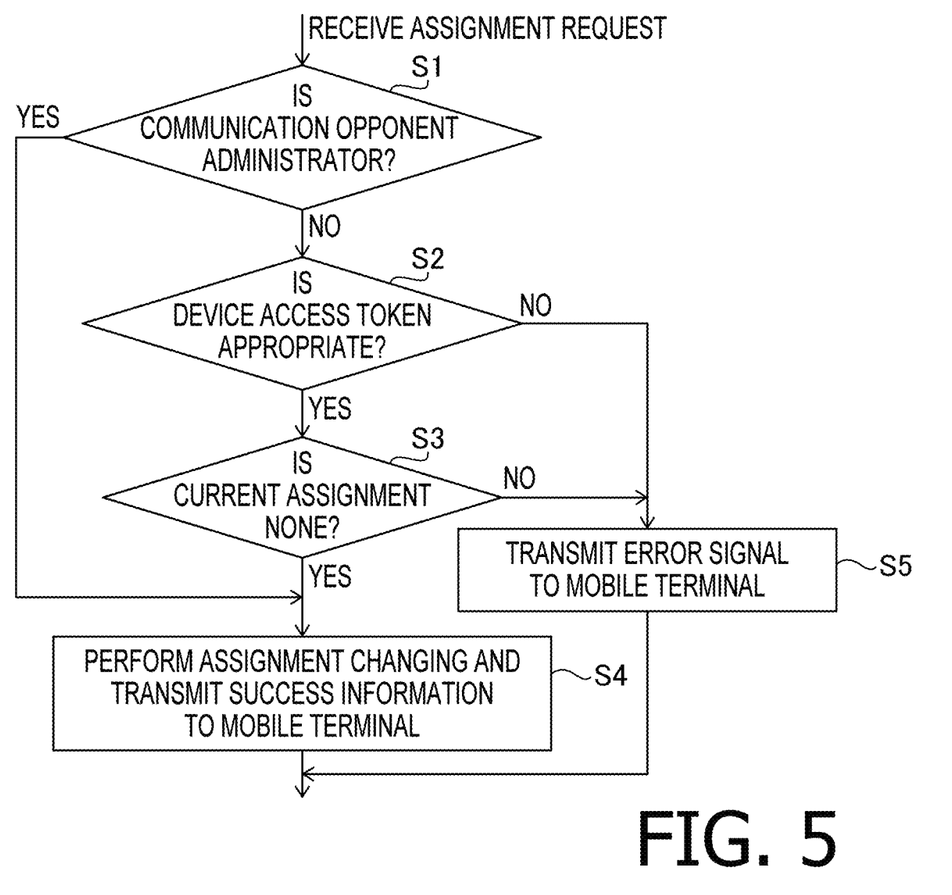
FIG. 5 is a flowchart illustrating a first designation state checking process performed by the MFP shown in FIG. 1.

As shown in FIG. 5, the MFP 10 first determines whether the mobile terminal 140, which is the communication destination, has administrative privileges (whether the particular administrative ID or equivalent information is included in the assignment request) (S1). When it is determined that the mobile terminal 140 has no administrative privilege (S1: NO), the device access token pertaining to the received assignment request is collated with the device access token temporarily stored in the RAM 83 (S2: collating process).

When it is determined that the device access token is appropriate in this collation (S2: YES), the process proceeds to step S3. When the device access token is not appropriate (S2: NO), an error signal is transmitted to the mobile terminal 140 (S5).

In step S3, the MFP 10 checks whether the assignment information currently stored in the EEPROM 84 is in a state where none of the multiple destination candidates has been designated (None) (first designation state checking process). When none of the destination candidates is designated (S3: YES), the process proceeds to S4 where the assignment information is changed to a state in which the server 160 is designated as the destination of the image data (CS16: first assignment information changing process). The MFP 10 then transmits, to the mobile terminal 140, information indicating that the assignment information has been successfully changed (CS17). When any of the information is designated (S3: NO), the change of the assignment information is inhibited, and an error signal is transmitted to the mobile terminal 140 (S5: change inhibition process). When it is determined that the mobile terminal 140 has the administrative privileges (S1: YES), the process in S4 is performed.

Then, the mobile terminal 140 transmits a deletion request to delete the device access token to the MFP 10 (BS10). The deletion request includes the device access token. When the MFP 10 confirms that the collation of the device access token pertaining to the received deletion request with the device access token temporarily stored in the RAM 83 has been successfully performed, the MFP 10 deletes the device access token temporarily stored in the RAM 83 (CS18). Then, the information that the deletion was successful is transmitted to the mobile terminal 140 (CS19).

At this time, the display 144 of the mobile terminal 140 displays a screen showing the completion of the setup of the cloud cooperation function and a list of functions that can be used with the cloud cooperation function.

Remote Scanning

Figure 6:
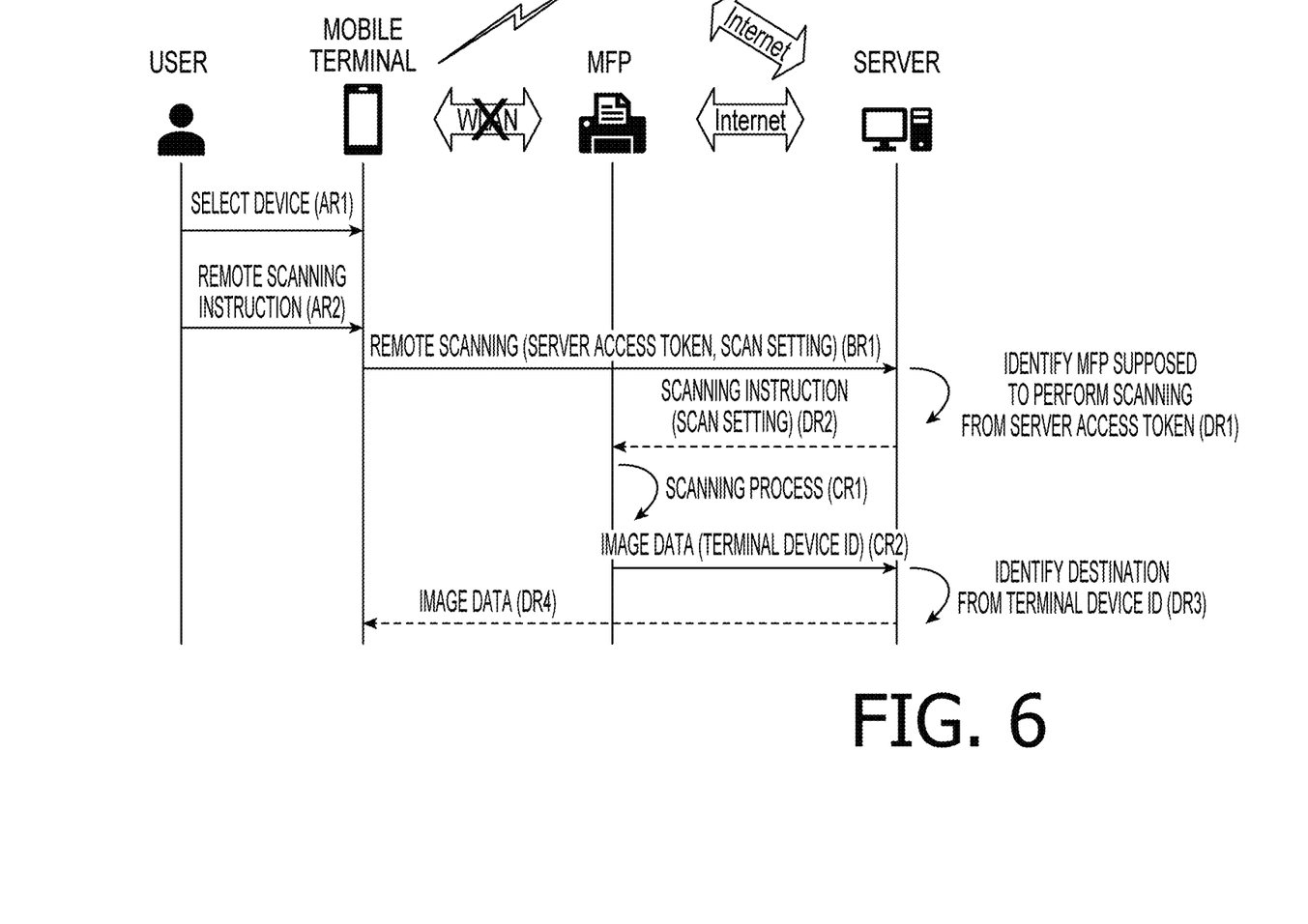
FIG. 6 is a sequence diagram of a series of scanning operations using the cloud cooperation function in the image scanning system including the MFP shown in FIG. 1.

Next, a remote scanning using the cloud cooperation function performed after the completion of the setup described referring to FIG. 3 will be described with reference to FIG. 6. In this embodiment, the remote scanning is to scan the document as the mobile terminal 140 supplies scanning instructions to the MFP 10 via the server 160 when the mobile terminal 140 and the MFP 10 are not in the same network and the mobile terminal 140 is connected to the Internet via the mobile communication module 147.

First, the user launches the MFP management app on the mobile terminal 140 and then performs the particular operations to the app by tapping on the display 144 to cause the display 144 to display a list of one or more devices (e.g., MFPs, printers, scanners, etc.) of which the cloud cooperation function is set up by the mobile terminal 140 using the app (i.e., which receive the server access tokens). In the present embodiment, only the devices of which expiration dates of the server access tokens are within the effective period are displayed in this list. This is achieved by storing the server access tokens received in CS13 in association with expiration dates, the device IDs, and app type information in EEPROM 143. The user then selects the desired device for remote scanning from among these devices by tapping the display 144 (AR1). The explanation will now proceed, assuming that the device selected here is the MFP 10 of FIG. 1. Alternatively, all the devices may be displayed in the list, and whether the server access token pertaining to the selected device is within the expiration date may be determined by the server receiving the remote scanning instruction BR1, which is described below.

The user then performs a particular operation to the app by tapping the display 144 to enter the setting information (such as scanning resolution, image size, etc.) to be used in the scanning process which is to be performed on the selected MFP 10, and finally performs an operation of a remote scanning instruction (AR2). Then, the mobile terminal 140 instructs the server 160 to remotely scan via the mobile communication module 147 based on the HTTPS protocol (BR1). This remote scanning instruction includes the server access token and setup information. The access information from the mobile terminal 140 to the server 160 may have been stored in the app in advance or included in the server access token.

When the server 160 receives the remote scanning instruction, the received server access token, and the setting information are stored in a temporary data storage 162b. The token collating part 161b of the server 160 collates the server access token included in the received remote scanning instruction with the server access token stored in the token storage 162a. When the collation is successfully performed, the MFP 10 that is to perform the scanning is identified based on the device ID, stored in the token storage 162a, in association with the server access token (DR1).

The server 160 then transmits a scanning instruction associated with the setting information for the scanning process to the identified MFP 10 via the Internet (DR2). Upon receiving the information, the MFP 10 performs the scanning of the document based on the setting information (CR1: scanning process). Further, the MFP 10 checks whether the assignment information stored in the EEPROM 84 does not designate any of the multiple destination candidates (CR1: second designation state checking process). In this explanation, at the time, it is assumed that the assignment information is already in the state of designating the server 160 as the transmission destination of the image data.

The MFP 10 then transmits the image data generated in the scanning process to the server 160 designated in the assignment information (CR2). At this time, the ID information of the terminal device (included in the scanning settings stored by the server 160 in advance in the EEPROM 84 of the MFP 10 via the Internet) is sent to the server 160 along with the image data. The server 160, which receives the image data, identifies the mobile terminal 140 as the destination from the ID information of the terminal device (DR3) and transmits the image data to the identified mobile terminal 140 via the Internet (DR4).

In the present embodiment described above, the assignment information that assigns the destination of the image data transmitted from the MFP 10 is changed when the assignment information does not designate any of the multiple destination candidates. Therefore, a user who is different from the user who has previously transmitted the enabling request with the mobile terminal 140 (e.g., a user who has designated another terminal device as the destination of the image data) will rarely cause an erroneous transmission due to the fact that the user does not know about the change in the destination terminal. Further, in this embodiment, the user only needs to select the device (ASA1) and tap the enable button (AS2) on the mobile terminal 140 side, and perform an approval operation (AS3) by tapping the "Yes" button on the MFP 10 side, and the need for complicated operations such as entering identification information and a password can be eliminated. As a result, it is more convenient for users to designate the destination of the image data.

In this embodiment, the MFP 10 transmits the assignment information to the mobile terminal 140 in advance (CS15) and receives the assignment request from the mobile terminal 140 only when the mobile terminal 140 confirms that none of the destination candidates has been designated (BS9). After receiving the assignment request (BS9), the assignment information is changed after confirming that none of the candidate senders are designated (CS16), without practically interposing any other processing. As a result, the assignment information may hardly be changed by mistake. Furthermore, since the assignment information is only changed when the destination of the image data is not assigned to the assignment information, the risk of erroneous transmission can be further reduced.

In this embodiment, a requirement for performing the first assignment information changing process (CS16) is that the device access token is required to have been approved. In other words, it is required that approval should be input to the LCD module 19, which can only be performed by an operator in the vicinity of the MFP 10, thus increasing security.

First Modification

Figure 7:
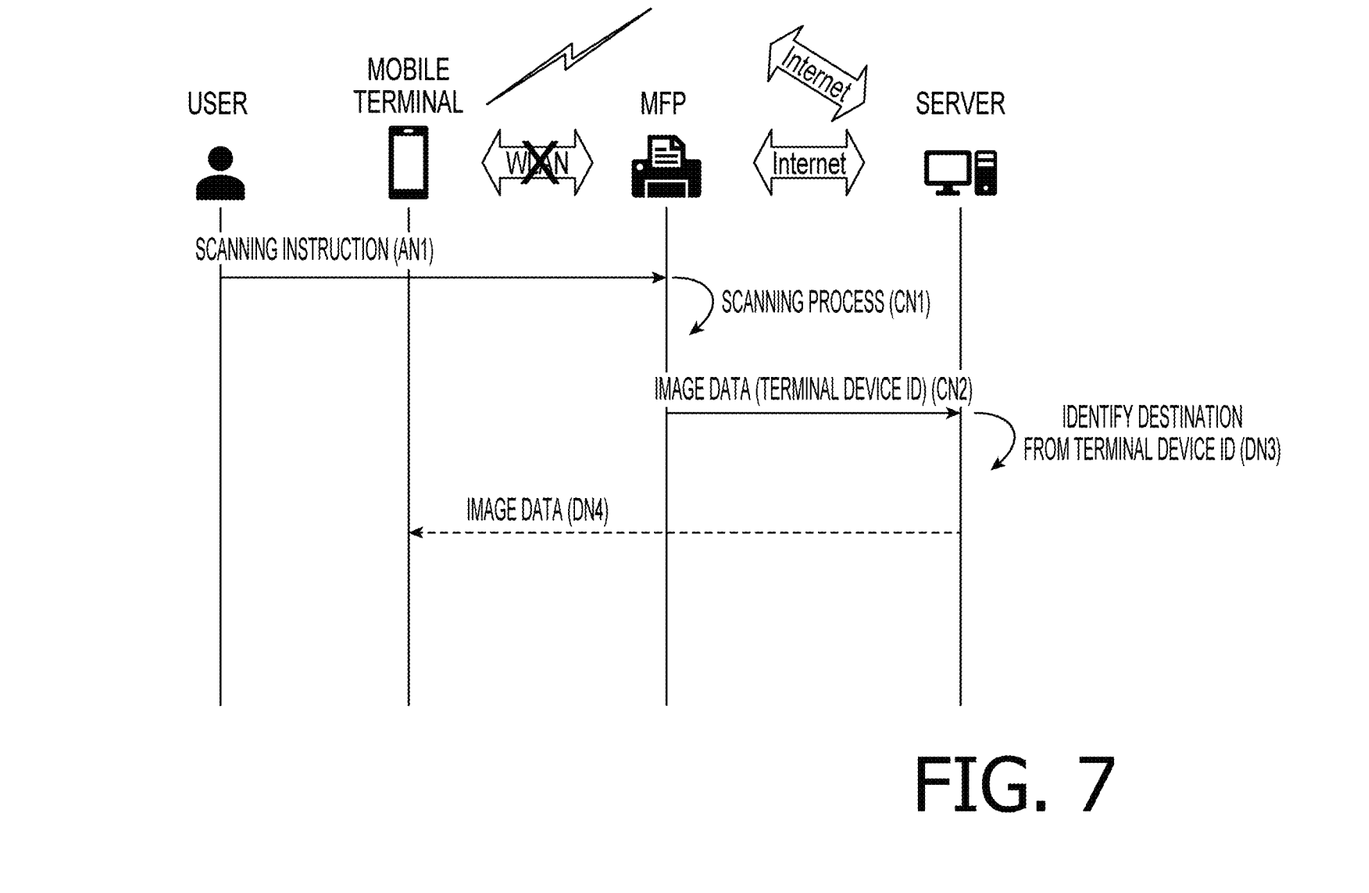
FIG. 7 is a sequence diagram of a series of scanning operations different from that shown in FIG. 6.

Next, a first modification of the above-described embodiment will be described with reference to FIG. 7. In the first modification, a setup the same setup as described in FIG. 3 is performed except that, although the first modification does not use the cloud cooperation function, neither processes R1 nor R2 is performed. Thereafter, the user performs a particular scanning instruction operation (e.g., depressing two physical buttons simultaneously) on the MFP 10 (AN1).

When the MFP receives the scanning instruction operation, the scanning module 18 performs the scanning process (CN1). Further, the MFP 10 checks whether the assignment information in the EEPROM 84 has not designated any of the multiple destination candidates (CN1: second designation state checking process). In this explanation, it is assumed that the assignment information is already in the state of designating the server 160 as the transmission destination of the image data at the time.

The MFP then transmits the image data generated in the scanning process to the server 160 that is designated in the assignment information (CN2). At this time, the ID information of the terminal (which is included in the scanning settings previously stored by the server 160 to the EEPROM 84 of the MFP via the Internet) is sent to the server 160 along with the image data. The server 160, which receives the image data, identifies the mobile terminal 140 as the destination based on the ID information of the terminal (DN3) and transmits the image data to the identified mobile terminal 140 via the Internet (DN4).

Second Modification.

Next, a second modification of the above-described embodiment will be described with reference to FIG. 2. According to the present modification, a PC 180 is connected to the USB module 27, and the PC 180 gives the scanning instruction to the MFP 10. In the present modification, the PC 180 communicates with the MFP 10 based on HTTPoverUSB.

First, the user launches the MFP management app installed on the PC 180 and displays the assignment request button on the display. When the assignment request button is tapped, the PC 180 transmits the assignment request to the MFP 10, requesting that the PC 180 is designated as the destination of the image data. The assignment request does not include a device access token. When the MFP 10 receives this assignment request (assignment request receiving process), the MFP 10 performs neither the administrator confirmation (S1) nor the collation process (S2) described in FIG. 5, but checks whether the assignment information in the EEPROM 84 is in a state where none of the multiple destination candidates has been designated (None) (first designation state checking process). The subsequent processes are the same as in the above-described embodiment.

As a further modification of the second modification, the PC 180 may request the MFP 10 to create the device access token (the enabling request) and receive the device access token from the MFP 10 before transmitting the assignment request to the MFP 10. In this case, the MFP 10 does not display a screen that prompts the user to perform the approval operation on the LCD module 19 (FIG. 4) and creates the device access token without requiring the user's approval operation. The created device access token is transmitted to the PC 180, which transmits the received device access token along with the assignment request to the MFP 10 when the assignment request button is tapped. Subsequent processes are the same as those in the above-described embodiment.

Thus, the second modification simplifies the processing for the enabling request and the assignment request from the secured USB-connected PC 180.

Third Modification

Figure 8:
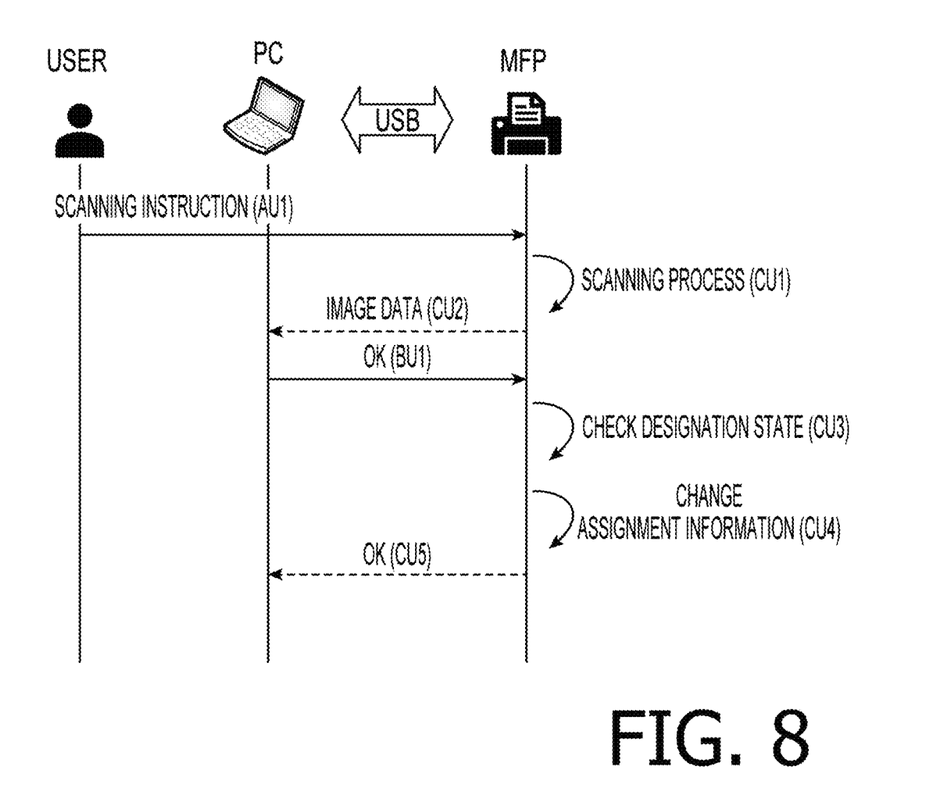
FIG. 8 is a sequence diagram of a series of scanning operations different from those shown in FIGS. 6 and 7.

A third modification will now be described with reference to FIG. 8. The third modification relates to the operation when the scanning process is performed in the second modification in which the PC 180 is connected to the USB module 27. This modification differs from the above-described embodiment and the first and second modifications in that none of the devices is assumed to be designated as a transmission destination in the assignment information when the scanning process is performed.

First, the user performs a particular scanning instruction operation on the MFP 10 (AU1). When the MFP receives the scanning instruction operation, the MFP 10 performs the scanning process with the scanning module 18 (CU1). The MFP 10 then transmits the image data generated in the scanning process to the USB-connected PC 180 (CU2).

The PC 180 then transmits information indicating that the image data has been received successfully to the MFP 10 (BU1). The MFP 10, which has received the information of successful reception of the image data from the PC 180, checks whether the assignment information in the EEPROM 84 has designated none of the multiple destination candidates (CU3: second designation state checking process). Then, when the assignment information is in a state where none of the assignment information has been designated as the destination of the image data, the assignment information is changed so that the USB-connected PC 180 is designated as the destination of the image data (CU4: second assignment information changing process). Further, the MFP 10 transmits information, to the PC 180, stating that the assignment information has been changed to the state in which the PC 180 is designated as the destination for sending the image data (CU5).

Thus, in the third modification, when there is a scanning request, the assignment of the destination terminal can be automatically changed to the USB-connected PC 180 without requiring complicated operations such as operations of the EWS after the scanning process. Since the change of the assignment information is conditional on receiving, from the PC 180, information indicating that the image data has been successfully received, when the scanning process fails due to a problem in communication with the PC 180 or because the PC 180 does not have the necessary software installed, it is possible to avoid that the PC 180 is designated as the destination of the image data.

If the second assignment information changing process is not executed when the scanning process is successful, the first or second assignment information changing process may be executed by another user's operation on the another user's terminal device afterward, which may result in an erroneous transmission when the user who was operating the PC 180 scans the image data again with the PC 180. In the present modification, it is possible to prevent such a situation. Further, in the present modification, since the USB-connected terminal device is designated in the assignment information, the assignment information can be easily changed without the need for a terminal device name Other Modifications Next, further modifications of the above-described embodiment will be described.

In the above-described embodiment, although the terminal device that transmitted the assignment request receives the image data via the server, the present disclosures are not necessarily be limited to such a configuration. A terminal device, which is different from the terminal device that transmitted the assignment request, may be configured to receive the image data via or not via the server.

The terminal device that transmits the assignment request does not have to be one of the multiple destination candidates.

In the above-described embodiment, the description is made such that the assignment information is in the initial state and none of the multiple destination candidates is designated. However, the controller may perform the same process as in the above-described embodiment after the controller rewrites the assignment information to a state in which none of the destination candidates is designated, instead of the initial state.

In the first assignment information changing process, two or more destination candidates may be designated as the destinations of the image data.

In the above-described embodiment, the query receiving process and the assignment information transmitting process (CS15) are performed, but such processes may be omitted. Alternatively, when the query receiving process and the assignment information transmitting process (CS15) are performed, the first designation state checking process may be omitted.

The change inhibition process described in S5 of FIG. 5 may be omitted.

Even if there is an enabling request or an assignment request from a terminal device other than the USB-connected PC 180, the approval operation of the user to approve remote access (remote scanning) may not be requested.

The above-described embodiments and the first modification may be applied to any terminal device other than a mobile terminal.

The second and third modifications may also be applied to any terminal device other than the USB-connected PC 180.

The MFP may not have the LCD module 19, but instead has a plurality of physical buttons as a receiving device and an LED lamp as a notification device. In such a modification, when the MFP shifts its state to the approval waiting state (CS3), the MFP flashes the LED lamp in a particular pattern for a particular period of time. The flashing pattern is meant to prompt the user to perform a particular approval operation (specifically, depressing two physical buttons simultaneously) to approve the enabling request. When the user depresses the two buttons simultaneously, the MFP confirms that the approval operation has been received and shifts its state to the access permission state. When the button is depressed continuously for a particular period of time or more, or when the button is depressed two or more particular times within a particular period of time, the state may be shifted to the access permission state.

In an image scanning apparatus that does not have a touch panel type display, if the user intends to set a destination of the image data without adopting the present disclosures since it is practically difficult to set the destination by depressing a relatively small number of physical buttons, it is necessary to use a screen provided by the EWS on the terminal device and perform complicated operations of inputting the administrator ID and password. By employing the above-described configurations, it becomes possible to easily set the destination of the image data in such an image scanning apparatus.

When the cloud cooperation function is set up, the device access token may not be created, but a terminal device token, which is the authentication information created by the terminal device, may be used instead.

After the approval operation, the MFP 10 may create a device access token and transmit the same to the mobile terminal 140, or the MFP 10 may create the device access token before the approval operation and transmit the same to the mobile terminal 140 after the approval operation.

The device access token and terminal token may not be used. Although any identification information may be used for the token, for security purposes, it is preferable that the token is a random character string issued each time.

The receiving section may be a physical button, a touch panel, or a contactless communication interface such as a Near Field Communication (NFC) card.

The mobile terminal may have no mobile communication module, but only a wireless LAN module.

In the above-described embodiment and modifications, the MFP has devices such as the LCD module or the LED lamp as the notification device. According to a modification, the image scanning apparatus may have a sound creating device such as a buzzer or speaker as the notification device, instead of the LCD module or the LED lamp.

The image scanning apparatus according to aspects of the present disclosures may have a notification device configured to output a notification signal that causes the mobile terminal to perform notification to the mobile terminal. In that case, for example, the notification device may display on the display of the mobile terminal an operation method of the MFP for performing the approval operation, or may output a message from the speaker of the mobile terminal to prompt the user to perform the approval operation.

Although suitable embodiment and modifications according to aspects of the present disclosures have been described above, aspects of the present disclosures are not limited to the above embodiment and modifications, and various design changes can be made to the above embodiment and modifications as far as the claims are concerned.

What is claimed is:

1. An image scanning apparatus, comprising:
 a scanning device configured to scan an image on a medium and generate image data;
 a storage configured to store candidate information regarding multiple destination candidates to which image data generated by the scanning device can be transmitted and assignment information used to assign a destination of the image data, the assignment information either designating one of the multiple destination candidates or designating none of the multiple destination candidates;
 a communication device; and
 a controller configured to:
 receive, from a terminal device via the communication device, an assignment request requesting to assign one of the multiple destination candidates as a destination to which the image data is to be transmitted;
 check whether assignment information designates none of the multiple destination candidates when the assignment request is received; and
 change a state of the assignment information such that one of the multiple destination candidates is designated as the destination of the image data when it is confirmed that the assignment information is in a state of designating none of the multiple destination candidates.

2. The image scanning apparatus according to claim 1, wherein the controller is further configured to:
 receive an inquiry regarding the assignment information from the terminal device via the communication device;

when the assignment information is in a state of designating none of the multiple destination candidates after the inquiry is received, transmit the assignment information indicating that none of the multiple destination candidates is designated to the terminal device via the communication device; and after transmitting the assignment information receive the assignment request.

3. The image scanning apparatus according to claim 1, wherein, when it is confirmed that the assignment information is in a state of designating any one of the multiple destination candidates, the controller is configured to not change the assignment information.

4. The image scanning apparatus according to claim 1, further comprising a receiving device configured to receive input by a user operation and a notifying device, wherein the controller is further configured:

receive, from the terminal device, an enabling request for enabling the terminal device to access the image scanning apparatus via the communication device;

cause the notifying device to make a notification after the receiving the enabling request;

check whether the receiving device receives an approval operation to approve the enabling request after the notification;

create a device access token related to access from the terminal device to the image scanning apparatus after receiving the enabling request;

transmit the device access token created to the terminal device that transmitted the enabling request via the communication device;

receive the device access token from the terminal device via the communication device;

a determine whether the received device access token is appropriate; and after it is confirmed that the receiving device has received the approval operation and it is determined that the device access token is appropriate, change the state of the assignment information such that one of the multiple destination candidates is designated as the destination of the image data.

5. The image scanning apparatus according to claim 4, wherein, when the terminal device is connected to the image scanning apparatus with a wired and non-network connection, the controller is configured to change the state of the assignment information without performing at least one of the notification, the checking or the determination whether the received device access token is appropriate in response to receipt of the enabling request from the terminal device or receipt of the assignment request without receiving the enabling request from the terminal device.

6. The image scanning apparatus according to claim 4, wherein, when a scanning request to perform scanning with the scanning device is received by the receiving device or the communication device, the controller is configured to:

check whether the assignment information is in a state of designating none of the multiple destination candidates; and change the state of the assignment information to a state of designating any one of the multiple destination candidates as the destination of the image data when it is determined that the assignment information is in the state of designating none of the multiple destination candidates.

7. The image scanning apparatus according to claim 6, wherein the controller is further configured to:

scan an image on a medium with the scanning device;

check whether the scanning is successfully completed; and change the assignment information when it is confirmed in the scan has been successfully completed and it is confirmed that the assignment information is in the state of designating none of the multiple destination candidates.

8. The image scanning apparatus according to claim 6, wherein the terminal device connected to the image scanning apparatus with a wired and non-network connection is designated as the destination of the image data.

9. The image scanning apparatus according to claim 1, wherein the terminal device includes a mobile terminal.

10. A method for controlling an apparatus having a scanning device configured to scan an image on a medium and generate image data, a storage and a communication device, wherein the storage is configured to store candidate information regarding multiple destination candidates to which image data generated by the scanning device can be transmitted and assignment information used to assign a destination of the image data, the assignment information either designating one of the multiple destination candidates or designating none of the multiple destination candidates, wherein the method comprising:

receiving, from a terminal device via the communication device, an assignment request requesting to assign one of the multiple destination candidates as a destination to which the image data is to be transmitted;

checking whether assignment information designates none of the multiple destination candidates when the assignment request is received;

and changing a state of the assignment information such that one of the multiple destination candidates is designated as the destination of the image data when it is confirmed that the assignment information is in a state of designating none of the multiple destination candidates.

11. An image scanning apparatus, comprising:

a scanning device configured to scan an image on a medium and generate image data;

a storage configured to store candidate information regarding multiple destination candidates to which image data generated by the scanning device can be transmitted and assignment information used to assign a destination of the image data, the assignment information either designating one of the multiple destination candidates or designating none of the multiple destination candidates, a communication device;

a receiving device configured to receive input by a user;

a notifying device; and a controller configured to:

receive, from a terminal device via the communication device, an assignment request requesting to assign one of the multiple destination candidates as a destination to which the image data is to be transmitted;

receive, from the terminal device, an enabling request for enabling the terminal device to access the image scanning apparatus via the communication device;

cause the notifying device to make a notification after receiving the enabling request;

check whether the receiving device receives an approval operation to approve the enabling request after the notification;
create a device access token related to access from the terminal device to the image scanning apparatus after receiving the enabling request;
transmit the device access token to the terminal device that transmitted the enabling request via the communication device;
receive the device access token from the terminal device via the communication device;
determine whether the received device access token is appropriate; and
change a state of the assignment information such that one of the multiple destination candidates is designated as the destination of the image data when the assignment request is received and after it is confirmed that the receiving device has received the approval operation and it is determined that the device access token is appropriate.

12. A method for controlling an apparatus having a scanning device configured to scan an image on a medium and generate image data, a storage configured to store candidate information regarding multiple destination candidates to which image data generated by the scanning device can be transmitted and assignment information used to assign a destination of the image data, the assignment information either designating one of the multiple destination candidates or designating none of the multiple destination candidates, a communication device, a receiving device and a notification device, the method comprising:

receiving, from a terminal device via the communication device, an assignment request requesting to assign one of the multiple destination candidates as a destination to which the image data is to be transmitted;
receiving, from the terminal device, an enabling request for enabling the terminal device to access the image scanning apparatus via the communication device;
causing the notifying device to make a notification after receiving the enabling request;
checking whether the receiving device receives an approval operation to approve the enabling request after the notification;
creating a device access token related to access from the terminal device to the image scanning apparatus after receiving the enabling request;
transmitting the device access token to the terminal device that transmitted the enabling request via the communication device;
receiving the device access token from the terminal device via the communication device;
determining whether the received device access token is appropriate; and
changing a state of the assignment information such that one of the multiple destination candidates is designated as the destination of the image data when the assignment request is received and after it is confirmed that the receiving device has received the approval operation and it is determined that the device access token is appropriate.

* * * * *